(12) United States Patent
Tacke et al.

(10) Patent No.: US 8,353,479 B2
(45) Date of Patent: Jan. 15, 2013

(54) ARRANGEMENT OF TWO FUSELAGE SECTIONS OF AN AIRCRAFT AND A CONNECTING STRUCTURE FOR CONNECTING FUSELAGE SKINS

(75) Inventors: Stefan Tacke, Buxtehude (DE); Thorsten Roming, Himmelpforten (DE); Klaus Edelmann, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 383 days.

(21) Appl. No.: 12/742,206

(22) PCT Filed: Nov. 13, 2008

(86) PCT No.: PCT/EP2008/009595
§ 371 (c)(1),
(2), (4) Date: Aug. 16, 2010

(87) PCT Pub. No.: WO2009/062712
PCT Pub. Date: May 22, 2009

(65) Prior Publication Data
US 2011/0001010 A1 Jan. 6, 2011

Related U.S. Application Data

(60) Provisional application No. 60/987,497, filed on Nov. 13, 2007.

(30) Foreign Application Priority Data

Nov. 13, 2007 (DE) .......................... 10 2007 054 053

(51) Int. Cl.
*B64C 1/00* (2006.01)

(52) U.S. Cl. ......... 244/119; 244/131; 244/132; 244/120
(58) Field of Classification Search .................. 244/119, 244/120, 131, 132
See application file for complete search history.

(56) References Cited

U.S. PATENT DOCUMENTS

| | | | | |
|---|---|---|---|---|
| 2,382,358 | A | * | 8/1945 | Watter .......................... 244/131 |
| 3,071,217 | A | * | 1/1963 | Gould .......................... 52/403.1 |
| 3,600,016 | A | * | 8/1971 | Dilley .......................... 403/389 |

(Continued)

FOREIGN PATENT DOCUMENTS

CN 1826451 A 8/2006

(Continued)

OTHER PUBLICATIONS

International Search Report for corresponding PCT application PCT/EP08/009595, dated Apr. 2, 2009.

(Continued)

*Primary Examiner* — Tien Dinh
*Assistant Examiner* — Justin Benedik
(74) *Attorney, Agent, or Firm* — Matthew B. Dernier, Esq.; Gibson & Dernier LLP

(57) ABSTRACT

A coupling element for connecting stringers in the process of joining two fuselage sections by means of at least one transverse splicing plate, wherein in each case the fuselage sections on the inside comprise a multitude of stringers arranged on fuselage skins, as well as annular frame elements, wherein the coupling element comprises a base flange and a frame element flange, and by way of the coupling element in each case a connection between the opposing stringers, the annular frame element and the fuselage skins or the transverse splicing plate takes place so that the coupling element beyond a connection of the stringer base also supports the connection of stringers on the flank side.

11 Claims, 3 Drawing Sheets

U.S. PATENT DOCUMENTS

| | | | |
|---|---|---|---|
| 3,920,206 A * | 11/1975 | Bigham et al. | 244/132 |
| 5,518,208 A * | 5/1996 | Roseburg | 244/132 |
| 6,073,405 A * | 6/2000 | Kasai et al. | 52/283 |
| 6,684,593 B2 * | 2/2004 | Brenneis et al. | 52/630 |
| 6,766,984 B1 * | 7/2004 | Ochoa | 244/119 |
| 7,823,362 B2 * | 11/2010 | Meyer | 52/713 |
| 8,156,711 B2 | 4/2012 | Hethcock et al. | |
| 2001/0015043 A1 * | 8/2001 | Brenneis et al. | 52/630 |
| 2005/0241358 A1 * | 11/2005 | Kaye | 72/379.2 |
| 2007/0011970 A1 | 1/2007 | Hethcock et al. | |
| 2008/0067289 A1 * | 3/2008 | Meyer | 244/131 |
| 2010/0282905 A1 * | 11/2010 | Cazeneuve et al. | 244/120 |
| 2012/0199269 A1 | 8/2012 | Hethcock et al. | |

FOREIGN PATENT DOCUMENTS

| | | |
|---|---|---|
| DE | 3115791 A1 | 8/1982 |
| EP | 0048191 A | 3/1982 |
| EP | 1127785 A | 8/2001 |
| GB | 2074117 A | 10/1981 |
| WO | 2004018183 A | 3/2004 |

OTHER PUBLICATIONS

Office Action for corresponding CN application No. 200880115949.9, dated Aug. 3, 2012.

International Preliminary Report on Patentability and Written Opinion for corresponding PCT application PCT/EP08/009595, dated Jun. 1, 2010.

* cited by examiner

ARRANGEMENT OF TWO FUSELAGE SECTIONS OF AN AIRCRAFT AND A CONNECTING STRUCTURE FOR CONNECTING FUSELAGE SKINS

CROSS REFERENCE TO RELATED APPLICATIONS

This application claims priority to PCT Application No. PCT/EP2008/009595, filed Nov. 13, 2008, which claims priority to German Patent Application No. DE 10 2007 054 053.3, filed Nov. 13, 2007, and claims the benefit to U.S. Provisional Patent Application No. 60/987,497, filed Nov. 13, 2007, the entire disclosures of which applications are hereby incorporated by reference.

BACKGROUND

The invention relates to an arrangement of two fuselage sections of an aircraft and a connecting structure for connecting fuselage skins.

Documents US-A-3 600 016, EP-A-0 048 191, EP-A-1 127 785 and GB-A-2 074 117 disclose a coupling element comprising a base flange for connecting two longitudinal stiffening elements of an fuselage to be connected.

Modern aircraft and in particular passenger aircraft are nowadays predominantly constructed in a sectional construction method. In this arrangement a multitude of pre-fabricated barrel-like fuselage sections are joined, so as to form circumferential transverse seams, to form the complete aircraft fuselage. Each fuselage section comprises a multitude of annular frame elements, which are preferably arranged one behind the other so as to be evenly spaced apart, which are clad with a circumferential fuselage skin. For further stiffening of the fuselage section, in each case between two annular frame elements a multitude of longitudinal stiffening elements are connected to the fuselage skin. The longitudinal stiffening elements, which as a rule are so-called stringers or stringer profiles, in each case essentially extend so as to be parallel to the longitudinal axis of the fuselage section and are arranged on the inside, circumferentially on the fuselage section, so as to be evenly spaced apart from each other. The longitudinal stiffening elements or stringer profiles, which in each case extend parallel to each other, can comprise a Z-shaped, an L-shaped, an Ω-shaped or some other cross-sectional geometry. The fuselage skin, the annular frame elements and the longitudinal stiffening elements can comprise aluminium alloy material, a fibre-reinforced plastic material, for example a carbon-fibre-reinforced epoxy resin, or a combination of the above-mentioned materials in a hybrid construction. The connection of two fuselage sections so as to in each case form a circumferential transverse seam requires a multitude of further components.

The fuselage skins are first connected, preferably so as to abut, with a transverse splicing plate that is at least circumferential in some regions. A circumferential annular frame element positioned in the region of the transverse seam is joined, by means of a multitude of cleats circumferentially arranged on the annular frame element, to the transverse splicing plate and to at least one of the two abutting fuselage skins. The remaining annular frame elements outside the transverse seam regions of the fuselage section can also be connected to the fuselage skin by means of such cleats. The opposing stringers in the region of a transverse seam are connected to a multitude of stringer couplings. Furthermore, in the joining technology that is presently used for the transverse butt joining of two fuselage sections, a multitude of support elements are provided by means of which support elements support is provided to the annular frame element in the transverse seam region to prevent tilting in relation to the fuselage skin. All the components mentioned need to be precisely positioned relative to the structural elements of the fuselage sections to be connected, and also need to be very precisely drilled and firmly joined by means of suitable connecting elements. Moreover, in particular a number of angle brackets and stringer couplings are to be provided and installed for each transverse abutting joint between two fuselage sections, which number as a rule corresponds to the number of stringers installed in the fuselage section. In this arrangement it must be taken into account in addition that the number of stringers required for stiffening a fuselage section generally-speaking increases proportionally to their cross-sectional dimensions so that the installation effort in fuselages of large cross-sectional dimensions increases considerably. Furthermore, all the holes need to be subjected to expensive sealing procedures and corrosion protection procedures.

Depending on the types of materials used in the fuselage sections to be joined, possible connecting elements are, for example, rivet elements or screws. As an alternative, thermal joining methods can be used. As an alternative, fibre-reinforced plastic materials can be joined with the use of adhesive connections so that there is no need to fabricate attachment holes.

SUMMARY OF THE INVENTION

It is the object of the invention to provide a coupling element for stringers, by means of which coupling element the number of coupling elements to produce a transverse abutting joint between two fuselage sections to be joined can be reduced in order to minimise the installation effort during the installation of fuselage sections to form a complete fuselage for aircraft.

This object is met by a coupling element with the characteristics disclosed and described herein. Further embodiments of the invention are also disclosed and described herein.

The invention provides, in particular, a coupling element comprising a base flange for connecting the two longitudinal stiffening elements to be connected and comprising a frame element flange, arranged on the base flange and extending at an angle to said base flange, for connecting an annular frame element. In particular, the mid-planes of the base flange and of the frame element flange can be aligned so as to be perpendicular to each other. The base flange and the frame element flange are in particular plate-shaped in design and can, in particular, be produced in one piece.

As a result of the coupling element comprising a base flange for connecting two longitudinal stiffening elements to be connected, in particular two stringers, and a frame element flange, arranged at the aforesaid and at an angle to the aforesaid, and in particular arranged so as to be essentially perpendicular, for connecting an annular frame element, it is no longer necessary to separately install angle brackets to safeguard the annular frame element against lateral tilt movements in relation to the fuselage skin, and consequently the installation effort required in the production of a transverse abutting joint between two fuselage sections thus creating a circumferential transverse seam is significantly reduced. The coupling element according to the invention for connecting stringers practically in a single integral component carries out the functions of joining the stringers, connecting the stringers to the fuselage skin or to the transverse splicing plate, and additionally safeguarding the annular frame elements against tilting.

By means of the coupling element according to the invention the mechanical connection of the stringers now takes place essentially only in the base region of the stringers.

According to an advantageous embodiment, a long side of the base flange makes a transition to an essentially triangular sheet-like element or connecting piece which is aligned so as to be essentially perpendicular, i.e. at 90°±15°, from which sheet-like element or connecting piece the frame element flange follows on at an angle and in particular at an angle of 90°±15°.

In one embodiment of the invention the base flange is designed in particular as an elongated plate with the also plate-shaped connecting piece extending from an edge of the base flange. The mid-planes of the base flange and of the connecting piece extend at an angle, and in particular at an angle of 90°±15° to each other. In particular, in the connecting region between the connecting piece and the base flange and in the connecting region between the connecting piece and the frame element flange the connecting region comprises two exposed edge lines, each extending from an edge of the base flange to an edge of the frame element flange. In this arrangement the exposed edge lines extend, in particular, at an angle to each other, wherein the exposed edge lines are straight in some regions, with the directions of said edge lines, starting from the base flange, converging at an acute angle. One or both of the exposed edge lines can also extend so as to be curved, wherein the above-mentioned directions result from the lines of gravity of the respective edge line.

The base flange, the frame element flange and the connecting piece situated between the aforesaid are, in particular, of a plate-shaped design, and can, in particular, together form a component produced in one piece.

This embodiment makes possible easy production of the coupling element, which production, for example in cases where the coupling element comprises an aluminium alloy material, apart from further processing steps, in particular chipping processing steps, comprises only two forming steps for creating the base flange and the frame element flange.

Furthermore, the relatively small number of areas of the coupling element that are arranged so as to be perpendicular to each other makes it possible to produce said coupling element with a fibre-reinforced plastic material, wherein the reinforcement fibres are preferably aligned along the flux.

According to an improvement of the coupling element, in order to form the frame element flange the sheet-like element is essentially positioned in the middle of the base flange. This arrangement provides a statically-favourable introduction of the tilting moments of the annular frame element, which tilting moments are to be absorbed, into the base flange of the coupling element, and thus into the stringers and the fuselage skin extending below them.

According to a further improvement, the coupling element is designed so as to be in one piece and, in particular, is produced in one piece. As a result of this, the number of components that are necessary for producing a transverse abutting joint between two fuselage sections and that are to be provided for this purpose can be significantly reduced and the installation expenditure can be minimized.

A further improvement of the coupling element provides for the coupling element already at the time of production to be made with a plurality or a multitude of precisely positioned holes for placing connecting elements. The holes, which are made so as to be precisely prepositioned, facilitate the alignment of the coupling element in the region of the transverse seam when joining the fuselage sections. Apart from this, the holes can contribute to guiding the drilling tools when the required attachment holes are made in structural elements of the fuselage sections. The structural elements are, among other things, the two fuselage skins, which are preferably connected so as to abut, the annular frame elements, the cleats for connecting the annular frame elements to the fuselage skins or to the transverse splicing plates, the transverse splicing plates themselves and the stringers or the longitudinal stiffening elements. At the same time, as a result of the premade holes the quantity of swarf to be disposed of and the installation expenditure are reduced. The multitude of holes, which have been placed in the form of a hole matrix within the coupling element, furthermore make it possible to implement, within wide limits, locally-variable attachment of the coupling element or spatially flexible connection of the structural elements to the coupling element.

A further embodiment of the coupling element provides for the sheet-like element to be an extension flange, in particular for lateral connection of stringers comprising a T-shaped or a Z-shaped cross-sectional geometry, wherein the extension flange is situated so as to be essentially perpendicular on the base flange. In addition to the mutual connection of the stringers in the region of the stringer base and their connection to the fuselage skin or the transverse splicing plates, this embodiment variant of the coupling element in a supplementary manner makes possible the connection of at least one stringer flank, which is essentially aligned so as to be perpendicular to the fuselage skin, to the coupling element, as a result of which the mechanical loadability of the stringers connected by means of the coupling element is further improved if required.

Furthermore, the invention provides for a combination comprising a longitudinal stiffening element, an annular frame element and a coupling element of an embodiment according to the invention.

BRIEF DESCRIPTION OF THE DRAWINGS

The following are shown in the drawing.

In the drawing, identical design elements can comprise the same reference characters.

DETAILED DESCRIPTION OF THE INVENTION

Figure 1:
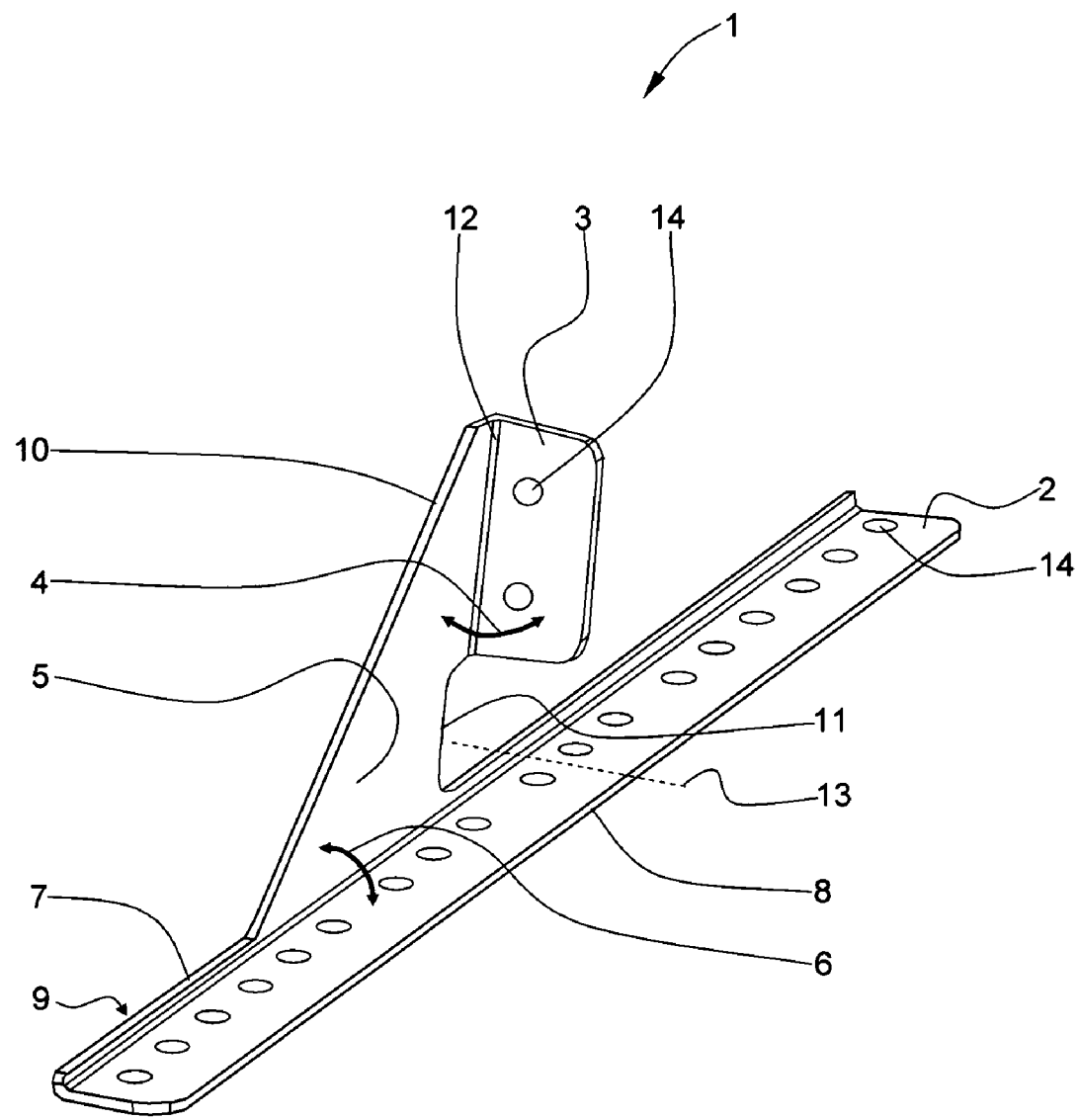
FIG. 1 illustrates a coupling element for longitudinal stiffening elements, in particular stringers, in the region of a transverse seam between two fuselage sections to be joined.

FIG. 1 shows a perspective view of a coupling element according to the invention. The single-piece coupling element 1 comprises: an elongated base flange 2, preferably comprising parallel longitudinal edges, for connecting a longitudinal stiffening element (not shown in FIG. 1), in particular a stringer, and a frame element flange 3 for connecting an annular frame element (not shown) in a fuselage section of an aircraft. The frame element flange 3 follows on at an angle 4 of approximately 90°, in particular of 90°±15°, from a preferably essentially triangular sheet-like element 5 or plate-shaped connecting piece. The sheet-like element 5 in turn follows on at an angle 6 of approximately 90°, in particular 90°±15°, from the base flange 2. The connecting piece 5 is situated between the frame element flange 3 and the base flange 2. The base flange 2 can, in particular, comprise an essentially rectangular geometry with two longitudinal edges or long sides 7, 8 that extend parallel to each other, wherein the frame element flange 3 or the in particular triangular sheet-like element 6 follows on from the (rear) long side 7. On the longitudinal edge 7 of the base flange, from which longitudinal edge 7 the connecting piece 5 extends, a raised edge 9 is provided to increase the flexural rigidity of the base flange 2, from whose edge the connecting piece 5 extends. Preferably, the width of the raised edge is less than 20% of the width of the base flange 2. The raised edge is preferably provided at an angle of 90°±15°.

The sheet-like element 5 comprises a bevelled edge 10 that in relation to the direction of the longitudinal edge 8 of the base flange 2 extends at an incline, i.e. at an angle, a rear edge 11 that in relation to the direction of the longitudinal edge 7 extends so as to be perpendicular to it or at an angle of 90°±15°, as well as an edge line 12 that extends at an angle and in particular approximately so as to be perpendicular (90°±15°) to the base flange 2 (to the mid-plane of same), from which edge line the frame element flange 3 follows on from the sheet-like element 5 or in which the frame element flange 3 makes a transition to the sheet-like element 5. In particular, the direction of the edge line 10 is at an angle of 90°±15° to the mid-plane of the base flange in longitudinal direction of said base flange. The edge line 12 extends approximately in the region of a mid-line 13 which divides the base flange 2 into two halves, i.e. the extension of the edge line 10 meets the plane of the base flange in a region of 20% of the longitudinal extent of the base flange laterally of the mid-line of said base flange in relation to its longitudinal direction. The described positioning of the triangular sheet-like element 5 or of the frame element flange 3, which is arranged thereon, on the base flange 2 makes possible a favourable introduction, from the point of view of statics, of tilting moments that starting at the frame element flange 3 are introduced into the coupling element 1 or the base flange 2.

Both the base flange 2 and the frame element flange 3 comprise a multitude of holes, of which only one hole 14, representative of the others, comprises a reference character. The holes 14 have preferably been arranged in the form of a matrix in the base flange 2 and in the frame element flange 3 in order to support locally variable positioning of the coupling element 1 and/or flexible connection of further components to the coupling element 1. The holes are used for the feeding-through of connecting elements (not shown in FIG. 1), for example rivets, screws or the like. As an alternative, the coupling element can also be connected to the further components of the fuselage structure by means of thermal welding methods.

The coupling element 1 can comprise an aluminium alloy material, a titanium alloy, a stainless steel alloy, a fibre-reinforced plastic material, Glare® or any desired combination of the above-mentioned materials. Glare® material is a multilayer layer design in which the layers of aluminium alloy material are bonded together in each case by means of adhesive layers covering the entire area. Preferably carbon-fibre-reinforced epoxy resins are considered as fibre-reinforced plastic materials. The adhesive layers can, for example, comprise a glass-fibre-reinforced polyester resin or epoxy resin.

Figure 2:
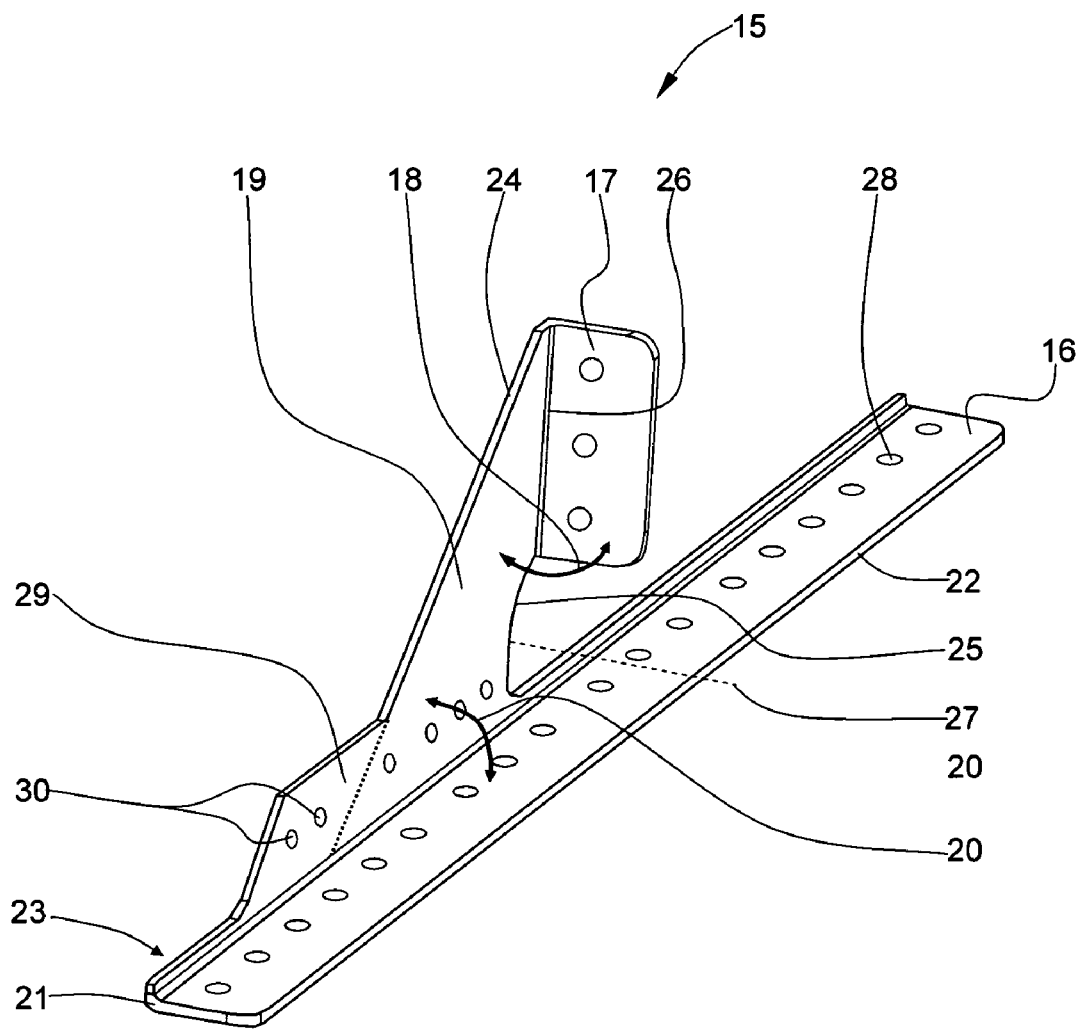
FIG. 2 illustrates an embodiment variant of the coupling element.

FIG. 2 shows an embodiment variant of the coupling element according to the invention. A coupling element 15 comprises, among other things, a base flange 16 and a frame element flange 17, which in each case are plate-shaped. The frame element flange 17 follows on at an angle 18 from an approximately triangular sheet-like element 19. Between the sheet-like element 19 and the base flange 16 there is an angle 20 of 90°±15°, i.e. the mid-planes, seen in their longitudinal extension, extend at an angle of 90°±15° to each other. The base flange 16 preferably comprises a rectangular shape with two long sides 21, 22 that extend parallel to each other and with transverse sides (not shown with reference characters in the figure), wherein in the region of the left-hand longitudinal side 21 in the top view of FIG. 2 a raised edge 23 is provided. The raised edge is an edge region of the base flange, with the mid-plane of said raised edge extending at an angle to the mid-plane of the remaining part or base body of the base flange, wherein the edge region extends along a lateral edge and preferably at constant width. The sheet-like element or the connecting piece 19 comprises: a bevelled edge 24 that extends, so as to be exposed, between the adjacent longitudinal edge of the base flange and a lateral edge of the frame element flange, as well as a rear edge 25 which preferably extends at an angle of 90°±15° and in particular 90° to the mid-plane of the base flange 16, as well as an edge line 26 which in relation to the mid-plane of the base flange 16, when viewed in longitudinal direction of said base flange 16, extends at an angle of 90°±15° and in particular 90°. The bevelled edge 24 can extend at an angle of 30 to 60° to the mid-plane of the base flange 16, when viewed in longitudinal direction of said base flange 16. The edge line 26 forms an "imaginary" dividing line between the frame element flange 17 and the sheet-like element 19, i.e. in the edge line the frame element flange 17 and the sheet-like element 19, which have been formed or produced in a single piece, make a transition. An imaginary extension of the edge line 26 downwards, i.e. towards the mid-plane of the base flange 16, reaches a region of the base flange that extends in longitudinal direction on both sides of the mid-line 27 of the longitudinal extension, which thus divides the base flange 16 into two halves, by 20% of the longitudinal direction. As a result of the shown positioning of the sheet-like element 19 on the base flange 16, an effective transfer of moments and forces acting on the frame element flange 17 to the base flange 16 is provided. Both the base flange 16 and the frame element flange 17 comprise a multitude of holes 28.

In contrast to the embodiment of the coupling element 1 already described in the context of FIG. 1, the coupling element 15—while otherwise similar in design—comprises an extension flange 29 with several holes 30. The extension flange 29 is situated in the connecting region between the longer, exposed, edge of the connecting piece 19 and the adjacent longitudinal edge of the base flange 16 and has been made in a single piece with the base flange 16 and the connecting piece 19. In the region of the sheet-like element 19 and of the extension flange 29 the base flange 16 preferably comprises an essentially L-shaped cross-sectional geometry, whereas the cross-sectional geometry of the base flange 16 in the remaining regions—apart from the slightly raised edge 23—is essentially rectangular in shape. The extension flange 29 practically represents a one-sided "continuation" of the sheet-like element 19 that is essentially triangular in shape. In the case of adhesion in at least some regions of the coupling element 15 it is possible to do away with at least some of the holes 18, 30.

By means of the extension flange 29 it is possible to connect stringer profiles (not shown in FIGS. 1, 2) as longitudinal stiffening elements in fuselage sections (compare FIG. 3), not only in the region of the stringer base but in addition in the region of a stringer flank that is essentially arranged so as to be perpendicular to the stringer base, to the coupling element 15 in order to in this way improve the mechanical load bearing capacity, or rigidity of the connection, of stringers to be connected by means of the coupling element 15 in a transverse seam region between two fuselage sections to be joined.

As far as the materials are concerned that can be used in the production of the coupling element 15, reference is made to the explanations provided above in the context of the description of the coupling element 1 (compare FIG. 1).

Figure 3:
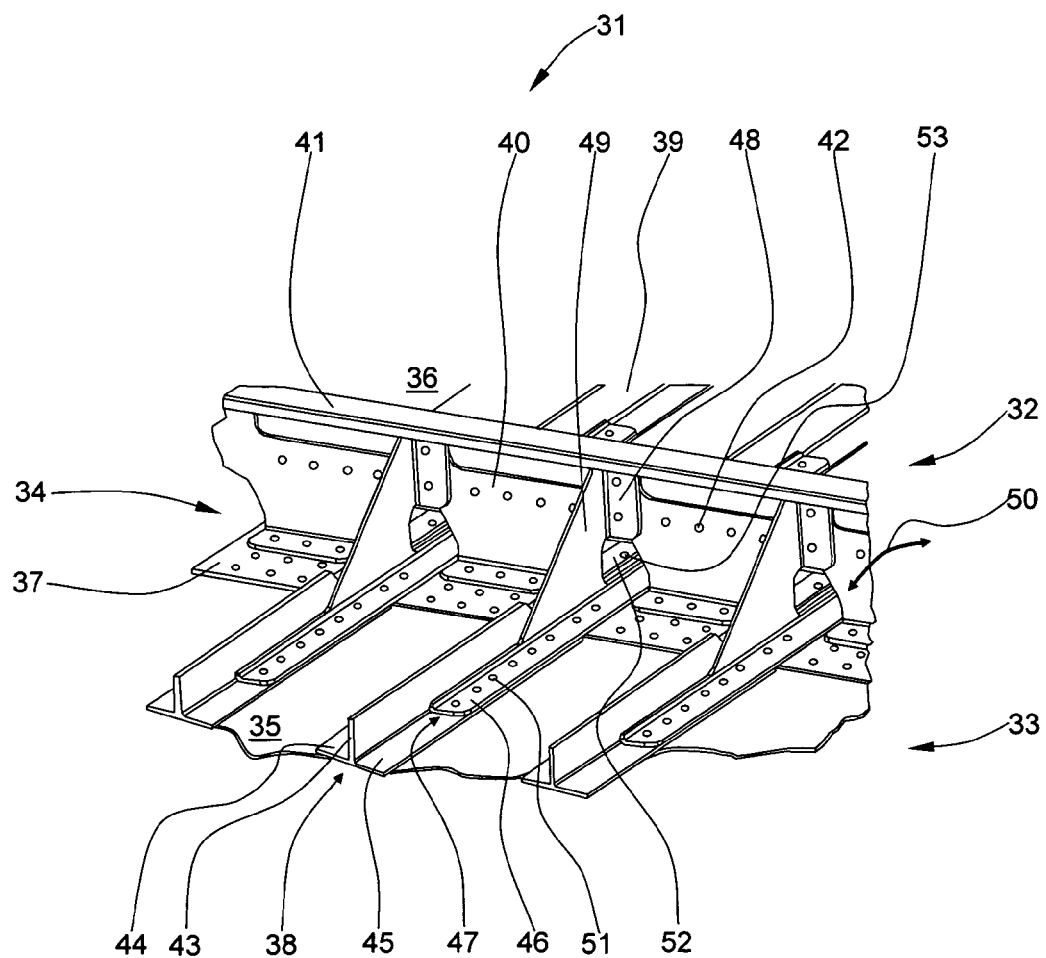
FIG. 3 illustrates a perspective view of the first embodiment variant in the installed state in the region of a transverse seam between two joined fuselage sections.

FIG. 3 shows a perspective view of a coupling element, designed according to the illustration provided in FIG. 1, in its installed state in a transverse seam region between two fuselage sections of a fuselage structure of an aircraft.

A fuselage structure 31 comprises among other things two fuselage sections 32, 33, which are joined in the region of a transverse seam 34. The fuselage skins 35, 36 of the two fuselage sections 32, 33 have been joined by means of a conventional transverse splicing plate 37 thus at the same time creating the transverse seam 34. On the fuselage skins 35, 36 a multitude of stringers 38, 39 are arranged or attached as longitudinal stiffening elements. The stringers 38, 39 converge in the regions of the transverse seam 34, which also applies to the further stringer pairs in the transverse seam region, in order to ensure largely tension-free connection by means of the coupling elements according to the invention.

In the region of the transverse seam 34 several (connecting-) cleats are provided, of which only one cleat 40 comprises a reference character. An annular frame element 41 or an annular frame-element segment is connected to the fuselage skins 35, 36, by means of a multitude of rivet elements, of which only one rivet element that is representative of the others is shown with a reference character 42, by way of the cleats 40 and the transverse splicing plate 37 extending below them.

Each stringer 38, 39 comprises an inverse T-shaped cross-sectional geometry. For example the front middle stringer 38—representative of all the others—comprises a perpendicular web 43 which at a lower end comprises base flanges 44, 45 that connect on both sides, wherein said base flanges 44, 45 point in opposite directions.

The right-hand base flange 45 of the stringer 38 is connected to a base flange 46 of a coupling element 47. A frame element flange 48 of the coupling element 47 is connected to the cleat 40 or the annular frame element 41. The design of the coupling element 47 is identical to the design of the coupling element 1 already explained in the context of the description of FIG. 1. By way of an essentially triangular sheet-like element 49, tilting moments and forces of the annular frame element 41 are transferred in the direction of an arrow 50 from the frame element flange 48, by means of the sheet-like element 49, to the base flange 46 of the coupling element 47. The mechanical connection between the coupling element 47, the right-hand base flange 45 of the stringer 38 and the fuselage skin 35 situated below, preferably takes place with the use of rivet elements, of which one rivet element 51 in a manner that is representative of all the remaining rivet elements comprises a reference character. Connection of the frame element flange 48 to the cleat 40 or to the annular frame element 41 extending behind it takes place in the same manner. All the rivet elements 42, 51 or holes for the rivet elements 42, 51 are preferably arranged in the form of a matrix in order to support matrix-like or stepped locally-variable attachment of the coupling element 47 in relation to remaining components of the fuselage structure 31. The left-hand base flange 44 of the front stringer 38 is connected to the rear stringer 39 by means of a multitude of rivet elements 53 by way of a simple rectangular or strip-shaped coupling element 52 (partly covered up).

Instead of the rivet elements 42, 51, 53 it is possible to use, for example, screws, clamping connections or the like as connecting elements. As an alternative, at least partial bonding of at least part of the previously described components (fuselage skins, stringers, annular frame elements, cleats, coupling elements) that represent the fuselage structure 31 is imaginable. All the components of the fuselage structure 31 can, for example, comprise an aluminium alloy, a titanium alloy, a stainless steel alloy, a fibre-reinforced plastic material or any desired combination thereof. In particular carbon-reinforced epoxy resin can be considered as fibre-reinforced plastics.

The alternative embodiment variant of the coupling element 15 according to FIG. 2 with an extension flange in the region of the sheet-like element, beyond mere connection of the stringer base flange, also makes it possible to mechanically connect a perpendicular web of the stringer or a perpendicular (lateral) flank. This embodiment variant is thus in particular provided in the case of static requirements for stringers with an inverse T-shaped or Z-shaped cross-sectional geometry (so-called "stringer-web connection").

By means of the coupling elements 1, 15, 47 for connecting stringers, in an integral component at the same time the functions of joining the stringers, of connecting the stringers to the fuselage skin or to the transverse splicing plate, and the provision of a tilting safeguard for the annular frame element in the region of the transverse splicing plate between the fuselage sections are implemented, and consequently the number of components to be joined in the creation of a transverse joint between two fuselage sections is reduced, as is the associated installation expenditure.

LIST OF REFERENCE CHARACTERS

1 Coupling element
2 Base flange
3 Frame element flange
4 Angle (frame element flange/sheet-like element)
5 Sheet-like element (triangular)
6 Angle (base flange/sheet-like element)
7 Long side  } base flange
8 Long side
9 Raised edge
10 Bevelled edge
11 Rear edge
12 Edge line
13 Mid-line
14 Hole
15 Coupling element
16 Base flange
17 Frame element flange
18 Angle
19 Sheet-like element
20 Angle
21 Long side  } base flange
22 Long side
23 Raised edge
24 Bevelled edge
25 Rear edge
26 Edge line
27 Mid-line
28 Hole
29 Extension flange
30 Hole
31 Fuselage structure
32 Fuselage section
33 Fuselage section
34 Transverse seam
35 Fuselage skin
36 Fuselage skin
37 Transverse splicing plate
38 Stringer (longitudinal stiffening element)

-continued

| | |
|---|---|
| 39 | Stringer (longitudinal stiffening element) |
| 40 | Cleat |
| 41 | Annular frame element |
| 42 | Rivet element |
| 43 | Web (stringer) |
| 44 | Left-hand base flange (stringer) |
| 45 | Right-hand base flange (stringer) |
| 46 | Base flange (coupling element) |
| 47 | Coupling element |
| 48 | Frame element flange (coupling element) |
| 49 | Sheet-like element |
| 50 | Arrow |
| 51 | Rivet element |
| 52 | Coupling element (strip-shaped flat material) |
| 53 | Rivet element |

The invention claimed is:

1. An arrangement, comprising:
two fuselage sections of an aircraft and a connecting structure for connecting fuselage skins by forming a transverse seam, the connecting structure comprising:
a transverse splicing plate which bears on edge regions of the fuselage skins being positioned adjacent to each other for connecting of the same along the transverse seam and which connects the same,
an annular frame element or annular frame element segment extending along the abutting joint, the annular frame element being connected with the transverse splicing plate on the inner side of the transverse splicing plate by means of plurality of cleats,
a plurality of stringers which are extending along each other and being positioned along the abutting joint side by side, each of which are connected to the same on the inner side of the fuselage skins respectively,
a coupling element comprising a base flange the end portions of which lying opposed to each other are connecting sections of stringers which are facing each other respectively and which are connected to a fuselage skin, and with a frame element flange which is connected with the annular frame element, wherein the base flange of the coupling element is extending between the transverse splicing plate and annular frame element or annular frame element and transverse thereto, so that the end sections thereof are connecting two stringers which are connected to two different fuselage skins, respectively.

2. The arrangement according to claim 1, wherein a long side of the base flange makes a transition to an essentially triangular sheet-like element which is aligned so as to be essentially perpendicular, from which sheet-like element the frame element flange follows on at an angle of approximately 90°.

3. The arrangement according to claim 1, wherein the sheet-like element is essentially positioned in a middle of the base flange.

4. The arrangement according to claim 1, wherein the coupling element is designed so as to be in one piece.

5. The arrangement according to claim 1, wherein in each case longitudinal stiffening elements in the region of the transverse seam are arranged so as to be opposite each other.

6. The arrangement according to claim 1, wherein the coupling element comprises a multitude of holes for the placement of connecting elements, in particular of rivet elements, for connecting the longitudinal stiffening elements, in particular the stringers, and the annular frame element.

7. The arrangement according to claim 1, wherein the sheet-like element comprises an extension flange, in particular for lateral connection, in particular on the flank side, of stringers with a T-shaped or Z-shaped cross-sectional geometry, wherein the extension flange is situated so as to be essentially perpendicular on the base flange.

8. The arrangement according to claim 1, wherein the coupling element comprises a fibre-reinforced plastic material and/or a metal alloy.

9. The arrangement according to claim 1, wherein the metal alloy is an aluminium alloy, a titanium alloy, a stainless steel alloy or a combination thereof.

10. The arrangement according to claim 1, wherein the coupling element comprises Glare®.

11. The arrangement according to claim 1, wherein the stringers have a T-shaped, Z-shaped or Ω-shaped cross-sectional geometry.

* * * * *